(12) United States Patent
Braford, Jr.

(10) Patent No.: US 8,375,816 B2
(45) Date of Patent: Feb. 19, 2013

(54) DUAL CLUTCH TRANSMISSION

(75) Inventor: Thomas E. Braford, Jr., Brighton, MI (US)

(73) Assignee: BorgWarner Inc., Auburn Hills, MI (US)

( * ) Notice: Subject to any disclaimer, the term of this patent is extended or adjusted under 35 U.S.C. 154(b) by 804 days.

(21) Appl. No.: 12/522,287

(22) PCT Filed: Jan. 16, 2008

(86) PCT No.: PCT/US2008/000521
§ 371 (c)(1),
(2), (4) Date: Jul. 7, 2009

(87) PCT Pub. No.: WO2008/088801
PCT Pub. Date: Jul. 24, 2008

(65) Prior Publication Data
US 2010/0081536 A1    Apr. 1, 2010

Related U.S. Application Data

(60) Provisional application No. 60/880,614, filed on Jan. 16, 2007.

(51) Int. Cl.
*F16H 3/08*      (2006.01)
*F16H 37/02*    (2006.01)
(52) U.S. Cl. .......................... 74/330; 475/218
(58) Field of Classification Search ............... 475/207, 475/218, 302; 74/329, 330, 331, 340, 356
See application file for complete search history.

(56) References Cited

U.S. PATENT DOCUMENTS

| 5,385,064 | A | 1/1995 | Reece |
| 5,711,409 | A | 1/1998 | Murata |
| 6,209,406 | B1 * | 4/2001 | Sperber et al. ................. 74/330 |
| 6,506,139 | B2 | 1/2003 | Hirt et al. |
| 6,595,077 | B1 * | 7/2003 | Geiberger et al. ............. 74/330 |
| 6,887,184 | B2 | 5/2005 | Buchanan et al. |
| 6,909,955 | B2 | 6/2005 | Vukovich et al. |
| 6,966,989 | B2 | 11/2005 | Hojsgaard et al. |
| 7,083,540 | B2 | 8/2006 | Janson et al. |
| 7,155,993 | B2 | 1/2007 | Koenig et al. |
| 7,175,563 | B2 | 2/2007 | Baldwin |
| 7,210,367 | B2 | 5/2007 | Akutagawa |
| 7,231,843 | B2 * | 6/2007 | Gumpoltsberger et al. .... 74/329 |
| 7,267,022 | B2 * | 9/2007 | Gumpoltsberger et al. .... 74/331 |
| 7,272,985 | B2 * | 9/2007 | Gumpoltsberger et al. .... 74/331 |
| 7,377,191 | B2 * | 5/2008 | Gitt ................................. 74/330 |
| 7,437,964 | B2 * | 10/2008 | Gitt ................................. 74/330 |
| 2005/0209042 | A1 | 9/2005 | Janson et al. |

(Continued)

FOREIGN PATENT DOCUMENTS
DE    3621545    1/1988
EP    1566569    8/2005
(Continued)

*Primary Examiner* — Troy Chambers
*Assistant Examiner* — Michael Gonzalez
(74) *Attorney, Agent, or Firm* — Warn Partners, P.C.

(57) ABSTRACT

A dual clutch transmission is provided which in a preferred embodiment includes a first and second input gears rotatable along a first axis and first and second clutches torsionally connected with the respective first and second input gears. First and second coaxial input shafts are provided having a plurality of selectively synchronized ratio defining gears rotatable along a second axis parallel with the first axis, the first and second input shafts are torsionally associated with the first and second input gears. An output shaft is provided that is rotatable along the first axis. The output shaft has gears meshing with the ratio defining gears of the first and second gear input shafts.

24 Claims, 3 Drawing Sheets

U.S. PATENT DOCUMENTS

2006/0048594 A1 3/2006 Gumpoltsberger et al.
2006/0101933 A1 5/2006 Koenig et al.
2006/0207655 A1 9/2006 Xiang et al.
2006/0219034 A1 10/2006 Hori et al.
2010/0016115 A1 1/2010 Braford, Jr.

FOREIGN PATENT DOCUMENTS

JP 2006-283797 10/2006

* cited by examiner

DUAL CLUTCH TRANSMISSION

This application is a National Stage of International Application No. PCT/US2008/000521, filed Jan. 16, 2008. This application claims priority to U.S. Provisional Patent Application No. 60/880,614 filed on Jan. 16, 2007. The disclosures of the above applications are incorporated herein by reference.

FIELD OF THE INVENTION

The present invention relates to dual clutch transmissions especially automatic shift dual clutch transmissions used for rear wheel drive passenger vehicles and light trucks.

BACKGROUND OF THE INVENTION

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle. Presently; there are two typical transmissions widely available for use in conventional motor vehicles. The first, and oldest type is the manually operated transmission. These transmissions include a foot operated start-up or launch clutch that engages and disengages the driveline with the power plant and a gearshift lever to selectively change the gear ratios within the transmission. When driving a vehicle having a manual transmission, the driver must coordinate the operation of the clutch pedal, the gearshift lever and the accelerator pedal to achieve a smooth and efficient shift from one gear to the next. The structure of a manual transmission is simple and robust and provides good fuel economy by having a direct power connection from the engine to the final drive wheels of the vehicle. Additionally, since the operator is given complete control over the timing of the shifts, the operator is able to dynamically adjust the shifting process so that the vehicle can be driven most efficiently. One disadvantage of the manual transmission is that there is an interruption in the drive connection during gear shifting. This results in losses in efficiency. In addition, there is a great deal of physical interaction required on the part of the operator to shift gears in a vehicle that employs a manual transmission.

The second, and newer choice for the transmission of power in a conventional motor vehicle is an automatic transmission. Automatic transmissions offer ease of operation. The driver of a vehicle having an automatic transmission is not required to use both hands, one for the steering wheel and one for the gearshift, and both feet, one for the clutch and one for the accelerator and brake pedal in order to safely operate the vehicle. In addition, an automatic transmission provides greater convenience in stop and go situations, because the driver is not concerned about continuously shifting gears to adjust to the ever-changing speed of traffic. Although conventional automatic transmissions avoid an interruption in the drive connection during gear shifting, they suffer from the disadvantage of reduced efficiency because of the need for hydrokinetic devices, such as torque converters, interposed between the output of the engine and the input of the transmission for transferring kinetic energy therebetween. In addition, automatic transmissions are typically more mechanically complex and therefore more expensive than manual transmissions.

For example, torque converters typically include impeller assemblies that are operatively connected for rotation with the torque input from an internal combustion engine, a turbine assembly that is fluidly connected in driven relationship with the impeller assembly and a stator or reactor assembly. These assemblies together form a substantially toroidal flow passage for kinetic fluid in the torque converter. Each assembly includes a plurality of blades or vanes that act to convert mechanical energy to hydrokinetic energy and back to mechanical energy. The stator assembly of a conventional torque converter is locked against rotation in one direction but is free to spin about an axis in the direction of rotation of the impeller assembly and turbine assembly. When the stator assembly is locked against rotation, the torque is multiplied by the torque converter. During torque multiplication, the output torque is greater than the input torque for the torque converter. However, when there is no torque multiplication, the torque converter becomes a fluid coupling. Fluid couplings have inherent slip. Torque converter slip exists when the speed ratio is less than 1.0 (RPM input>than RPM output of the torque converter). The inherent slip reduces the efficiency of the torque converter.

While torque converters provide a smooth coupling between the engine and the transmission, the slippage of the torque converter results in a parasitic loss, thereby decreasing the efficiency of the entire powertrain. Further, the torque converter itself requires pressurized hydraulic fluid in addition to any pressurized fluid requirements for the actuation of the gear shifting operations. This means that an automatic transmission must have a large capacity pump to provide the necessary hydraulic pressure for both converter engagement and shift changes. The power required to drive the pump and pressurize the fluid introduces additional parasitic losses of efficiency in the automatic transmission.

In an ongoing attempt to provide a vehicle transmission that has the advantages of both types of transmissions with fewer of the drawbacks, combinations of the traditional "manual" and "automatic" transmissions have evolved. Most recently, "automated" variants of conventional manual transmissions have been developed which shift automatically without any input from the vehicle operator. Such automated manual transmissions typically include a plurality of power-operated actuators that are controlled by a transmission controller or some type of electronic control unit (ECU) to automatically shift synchronized clutches that control the engagement of meshed gear wheels traditionally found in manual transmissions. The design variants have included either electrically or hydraulically powered actuators to affect the gear changes. However, even with the inherent improvements of these newer automated transmissions, they still have the disadvantage of a power interruption in the drive connection between the input shaft and the output shaft during sequential gear shifting. Power interrupted shifting results in a harsh shift feel that is generally considered to be unacceptable when compared to smooth shift feel associated with most conventional automatic transmissions.

To overcome this problem, other automated manual type transmissions have been developed that can be power-shifted to permit gearshifts to be made under load. Examples of such power-shifted automated manual transmissions are shown in U.S. Pat. No. 5,711,409 issued on Jan. 27, 1998 to Murata for a Twin-Clutch Type Transmission, and U.S. Pat. No. 5,966,989 issued on Apr. 4, 2000 to Reed, Jr. et al for an Electro-mechanical Automatic Transmission having Dual Input Shafts. These particular types of automated manual transmissions have two clutches and are generally referred to simply as dual, or twin, clutch transmissions. The dual clutch structure is most often coaxially and cooperatively configured so as to derive power input from a single engine flywheel arrangement. However, some designs have a dual clutch assembly that is coaxial but with the clutches located on opposite sides of the transmissions body and having different input sources. Regardless, the layout is the equivalent of having two transmissions in one housing, namely one power transmission assembly on each of two input shafts concomitantly driving one output shaft. Each transmission can be shifted and clutched independently. In this manner, uninterrupted power upshifting and downshifting between gears, along with the high mechanical efficiency of a manual transmission is available in an automatic transmission form. Thus, significant increases in fuel economy and vehicle performance may be achieved through the effective use of certain automated manual transmissions.

The dual clutch transmission structure may include two dry disc clutches each with their own clutch actuator to control the engagement and disengagement of the two-clutch discs independently. While the clutch actuators may be of the electromechanical type, since a lubrication system within the transmission requires a pump, some dual clutch transmissions utilize hydraulic shifting and clutch control. These pumps are most often gerotor types, and are much smaller than those used in conventional automatic transmissions because they typically do not have to supply a torque converter. Thus, any parasitic losses are kept small. Shifts are accomplished by engaging the desired gear prior to a shift event and subsequently engaging the corresponding clutch. With two clutches and two inputs shafts, at certain times, the dual clutch transmission may be in two different gear ratios at once, but only one clutch will be engaged and transmitting power at any given moment. To shift to the next higher gear, first the desired gears on the input shaft of the non-driven clutch assembly are engaged, then the driven clutch is released and the non-driven clutch is engaged.

This requires that the dual clutch transmission be configured to have the forward gear ratios alternate arranged on their respective input shafts. In other words, to perform up-shifts from first to second gear, the first and second gears must be on different input shafts. Therefore, the odd gears will be associated with one input shaft and the even gears will be associated with the other input shaft. In view of this convention, the input shafts are generally referred to as the odd and even shafts. Typically, the input shafts transfer the applied torque to a single counter shaft, which includes mating gears to the input shaft gears. The mating gears of the counter shaft are in constant mesh with the gears on the input shafts. The counter shaft also includes an output gear that is meshingly engaged to a gear on the output shaft. Thus, the input torque from the engine is transferred from one of the clutches to an input shaft, through a gear set to the counter shaft and from the counter shaft to the output shaft.

Gear engagement in a dual clutch transmission is similar to that in a conventional manual transmission. One of the gears in each of the gear sets is disposed on its respective shaft in such a manner so that it can freewheel about the shaft. A synchronizer is also disposed on the shaft next to the freewheeling gear so that the synchronizer can selectively engage the gear to the shaft. To automate the transmission, the mechanical selection of each of the gear sets is typically performed by some type of actuator that moves the synchronizers. A reverse gear set includes a gear on one of the input shafts, a gear on the counter shaft, and an intermediate gear mounted on a separate counter shaft meshingly disposed between the two so that reverse movement of the output shaft may be achieved.

It is desirable to provide a dual clutch transmission with wherein in at least one preferred embodiment the output shaft can be common with the counter shaft in a manner that is an alternative to prior revealed dual clutch transmission.

SUMMARY OF THE INVENTION

Other features of the invention will become more apparent to those skilled in the art as the invention is further revealed in the accompanying drawings and Detailed Description of the Invention.

DETAILED DESCRIPTION OF THE INVENTION

Figure 1A:
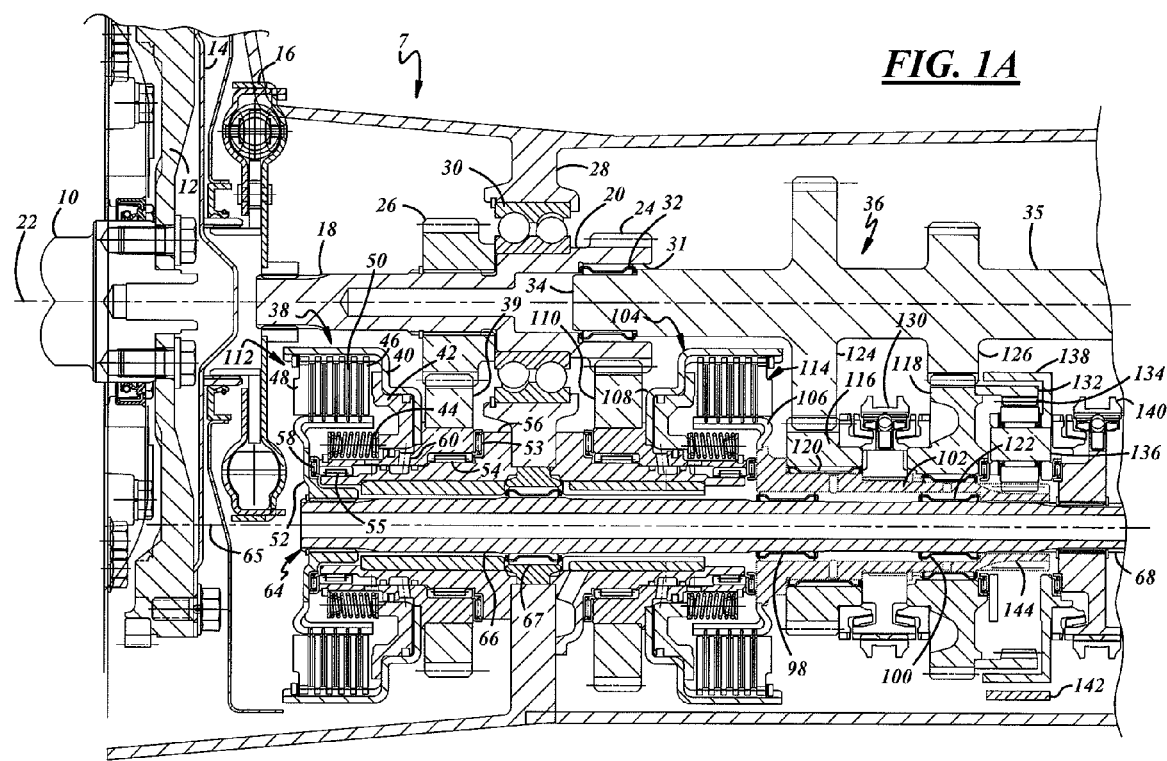
FIGS. 1A and 1B are overlapping sectional views of a dual clutch transmission of the present invention.
Figure 1B:
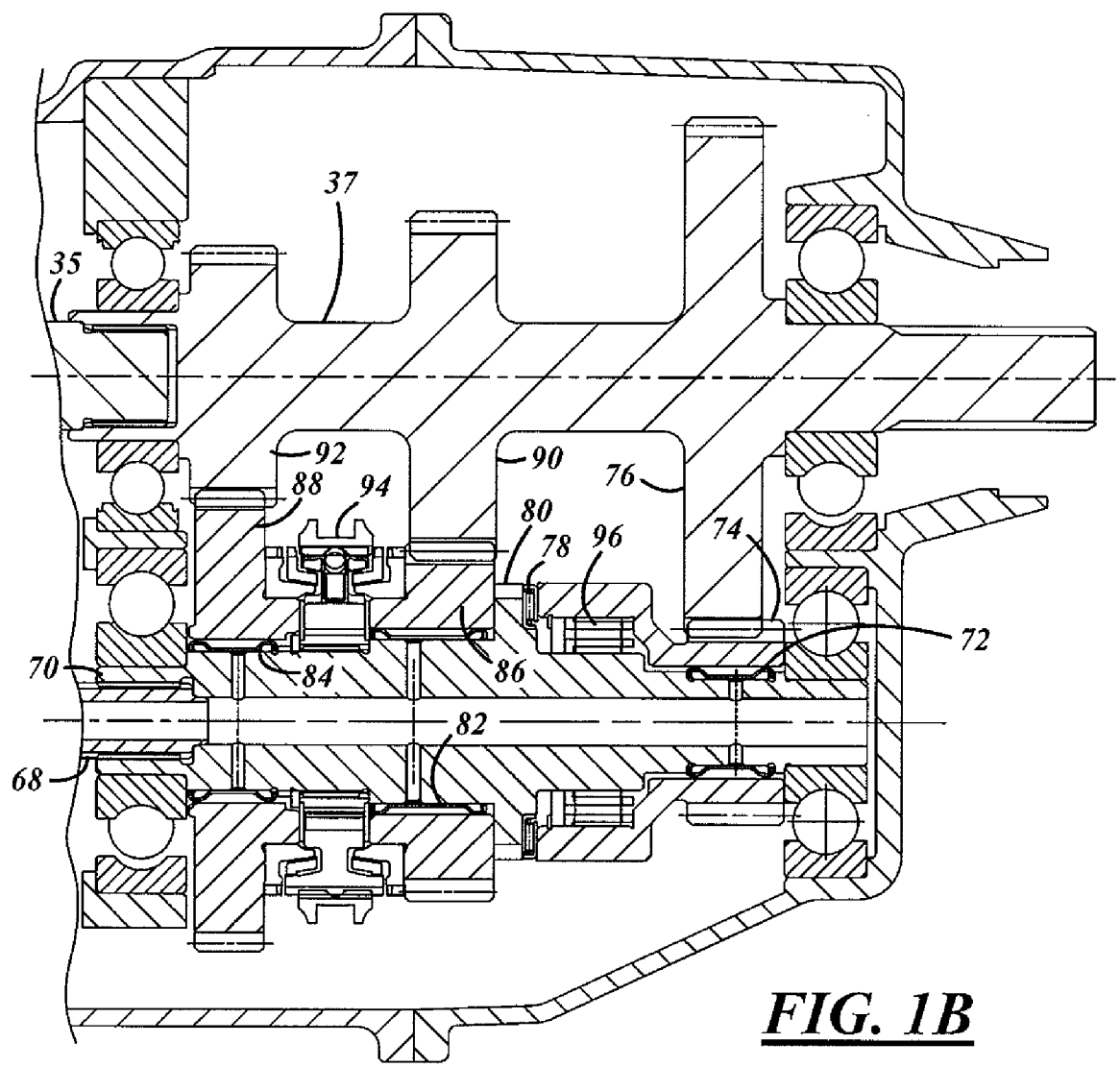

Referring of FIGS. 1A and 1B, an engine output shaft 10 is bolt connected to a flywheel 12. The flywheel 12 has a bolt connected plate 14 with a spline connection with a damper 16. The damper 16 provides an input to a dual clutch transmission 7 of the present invention. The damper 16 has a spline connection with a stem portion 18 of an input gear housing 20. The input gear housing 20 rotates about a first axis 22. The gear housing 20 is integrally formed with a second input gear 24. Torsionally affixed with the input gear housing 20 is a first input gear 26. The gear housing 20 is rotatably mounted with a frame 28 of transmission 7 by a bearing 30. The bearing 30 is positioned between the input gears 24 and 26. The gear housing 20 has an opening 31 that rotatably mounts via a bearing 32 a front end 34 of a multiple-piece output shaft 36 having a front portion 35 and a rear portion 37.

The first input gear 26 is torsionally associated by a meshing gear connection with a first clutch 38. The clutch 38 has a gear 39 connected with a clutch housing 40. The clutch housing 40 mounts a piston 42 that is biased to a non-engaged position by a spring 44. The clutch housing 40 also has a spline connection with a series of pressure plates 46 and an end plate 48. The pressure plates 46 are juxtaposed by a series of friction plates 50. The friction plates 50 are torsionally connected by a spline connection with a hub 52.

The clutch 38 is rotatably mounted to the frame 28 by bearings 53, 54 and 55 that rotate on a clutch support 56 that is generally fixed with the frame 28. A bearing 58 separates the hub 52 from clutch housing 40. The clutch housing 40 has a clutch pressurization inlet 60 for activation of the piston 42.

The hub 52 is splined to a multiple-piece first input shaft 64 having a front portion 66. The first input shaft 64 rotates along second axis 65 that is parallel with the first axis 22. A bearing 67 mounted to the frame 28 mounts the front portion 66. The input shaft front portion 66 has a male splined rear end 68 which is splined to a first input shaft rear portion 70. Mounted on the rear portion 70 by a bearing 72 is a gear ratio defining first gear pinion 74. The pinion 74 meshes with an output shaft gear 76. A thrust bearing 78 separates the pinion 74 from a flange 80 of the rear portion 70. Rotatably mounted on the rear portion 70 by bearings 82 and 84 are third and fifth gears 86 and 88. Bearing 72, 82 and 84 are lubricated via oil passages that intersect an axial extending interior bore of the first input shaft 64.

The third gear 86 meshes with the output shaft gear 90. The fifth gear 88 meshes with the output shaft gear 92. The odd gear ratios of the gears on the first input shaft 64 increase in a forward direction.

A two-way synchronizer 94 can be selectively actuated to connect the third gear 86 or the fifth gear 88 with the first input shaft 64. The synchronizer 94 can be hydraulic synchronizer or a mechanical split fork synchronizer as shown. The first pinion 74 can be connected with the first input shaft by a synchronizer or by a one-way clutch 96. The one-way clutch 96 can be on the input side of the pinion 74 (left side in FIG. 1) thereby reducing, the maximum torque requirements of the one-way clutch 96.

Concentrically mounted by bearings 98 and 100 on the first input shaft 64 is a second input shaft 102. The second input shaft 102, by a hub 106, is torsionally connected with a second clutch 104. The second clutch 104 is identical or substantially similar in design and function with the clutch 38. The second clutch 104 has a housing 108 fixedly connected with a gear 110 that is in mesh with the second input gear 24. The friction packs 112 and 114 of the first and second clutches are outboard of the input gears 26 and 24. The second and forth gears 116 and 118 are mounted on the second input shaft 102 by bearings 120 and 122. The even engine gear ratios on the second input shaft 102 decrease forwardly. Second and forth gears 116 and 118 mesh with gears 124 and 126 of the output shaft 36. Synchronizer 130 can selectively connect the second gear 116 or the forth gear 118 with the second input shaft 102.

The gear 118 is connected with a ring gear 132. Ring gear 132 is in mesh with planet gears 134 (only one gear 134 shown). The planet gears 134 are mounted on a carrier 136. The carrier 136 has fixably connected thereto a drum 138. The first input shaft forward portion splined end 68 mounts a torsionally fixed synchronizer 140. A band brake 142 or a clutch (not shown) is provided to selectively ground the carrier 136 via the drum 138.

A geared end of the second input shaft provides a sun gear 144 for the planetary gear set. Grounding the drum 138 reverses the gear 118 thereby reversing the output shaft 36. Because the diameter of the input gear 26 is greater than the second input gear 24, the first input shaft 64 rotates faster than the second input shaft 102 (assuming full engagement of the first and second clutches 38 and 104). The synchronizer 140 can be actuated to overdrive the carrier 136. The sun gear 144 drives the planet gears on the carrier 134 causing a gear ratio increase in output of the ring gear 132 and forth gear 118. Accordingly, a six gear is realized.

Figure 2:
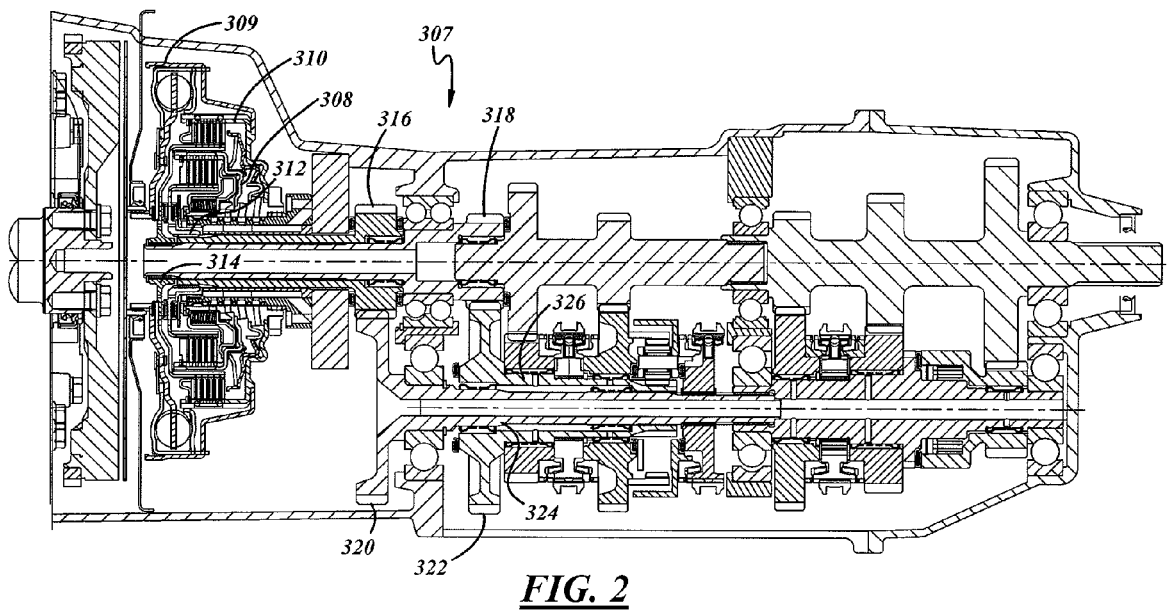
FIG. 2 is a sectional view of an alternative preferred embodiment dual clutch transmission of the present invention.

Referring to FIG. 2, a dual clutch transmission 307 is shown having co-axial first and second clutches 308, 310 torsionally connected with a damper 309 input to the transmission. The clutches 308, 310 have hubs 312, 314 with splined connections with first and second input gears 316, 318. The first and second input gears 316, and 318 are in mesh with gears 320 and 322 that are integral with the first and second input shafts 324 and 326. The remainder of the apparatus and function of the transmission 307 is substantially similar or identical to that previously explained for transmission 7.

While preferred embodiments of the present invention have been disclosed, it is to be understood it has been described by way of example only, and various modifications can be made without departing from the spirit and scope of the invention as it is encompassed in the following claims.

The invention claimed is:

1. A dual clutch transmission comprising:
a first input gear rotatable along a first axis:
a second input gear rotatable along said first axis:
a first input shaft having a plurality of ratio defining gears rotatable along a second axis parallel with said first axis, said first input shaft being torsionally connected with said first input gear via a first clutch rotatable along said second axis;
a second input shaft having a plurality of ratio defining gears rotatable along said second axis, said second input shaft being torsionally connected with said second input gear via a second clutch rotatable along said second axis; and
an output shaft having gears meshing with said ratio defining gears of said first and second input shafts.

2. A transmission as described in claim 1 wherein said output shaft rotates along said first axis.

3. A transmission as described in claim 1 wherein said first input shaft is concentric with said second input shaft.

4. A transmission as described in claim 1 wherein said first input shaft mounts ratio defining gears for odd gear ratios.

5. A transmission as described in claim 1 wherein a front end of said output shaft is rotatively mounted within at least one of said input gears.

6. A transmission as described in claim 1 wherein said ratio defining gears on said first input shaft can be selectively synchronized.

7. A transmission as described in claim 1 wherein said ratio defining gears on said second input shaft can be selectively synchronized.

8. A transmission as described in claim 1 wherein said first input shaft ratio defining gears increase in gear ratio in a direction forwardly towards said second clutch.

9. A transmission as described in claim 1 wherein said second input shaft ratio defining gears decrease in gear ratio in a direction forwardly toward said second clutch.

10. A transmission as described in claim 1 wherein friction packs of said first and second clutches are outboard of geared connections of said first and second clutches with said first and second input gears.

11. A transmission as described in claim 1 wherein said ratio defining gear for a first gear ratio is a pinion gear rotatively mounted on a respective input shaft by a bearing.

12. A transmission as described in claim 1 wherein said first input shaft rotates faster than said second input shaft when both input shafts are fully clutched.

13. A transmission as described in claim 1 wherein said first and second input gears are connected with a damper.

14. A transmission as described in claim 1 wherein said output shaft is a multiple-piece shaft.

15. A transmission as described in claim 1 wherein at least one of said input shafts is a multiple-piece shaft.

16. A transmission as described in claim 1 wherein said input gears are torsionally fixed with one another.

17. A transmission as described in claim 16 wherein a frame member between said first and second input gears rotatably supports first and second input gears.

18. A transmission as described in claim 1 wherein said ratio defining gear for a first gear ratio is connected with a respective input shaft by a one way clutch.

19. A transmission as described in claim 18 wherein said one way clutch is on an input side of said ratio defining gear.

20. A transmission as described in claim 1 wherein one of said ratio defining gears is selectively synchronized on one of said first and second input shafts and said ratio defining gear is connected to a ring gear which is in mesh with a plurality of planetary gears having a common carrier and said one of said first and second input shafts when in mesh with said planetary gears provides reverse gear when said carrier is grounded.

21. A transmission as described in claim 20 wherein said carrier can be synchronized with one other of said first and second input shafts to provide an additional gear ratio to said ratio defining gear.

22. A transmission as described in claim 21 wherein said additional gear ratio is an increased gear ratio.

23. A dual clutch transmission comprising:

a first input gear rotatable along a first axis:

a second input gear rotatable along said first axis:

a first input shaft having a plurality of selectively synchronized ratio defining gears rotatable along a second axis parallel with said first axis, said first input shaft being torsionally connected with said first input gear via a first clutch rotatable along said second axis;

a second input shaft concentric with said first input shaft having a plurality of plurality of selectively synchronized ratio defining gears, said second input shaft being torsionally connected with said first input gear via a second clutch rotatable along said second axis; and an output shaft rotatable along said first axis having gears meshing with said ratio defining gears of said first and second gear input shafts.

24. A dual clutch transmission comprising:

a first input gear rotatable along a first axis;

a second input gear rotatable along said first axis;

first and second clutches torsionally connected with said respective first and second input gears;

a first input shaft having a plurality of selectively synchronized ratio defining gears rotatable along a second axis parallel with said first axis, said first input shaft being torsionally associated with said first input gear;

a second input shaft concentric about said first input shaft having a plurality of selectively synchronized ratio defining gears, said second input shaft being torsionally associated with said second input gear;

an output shaft rotatable along said first axis having gears meshing with said ratio defining gears of said first and second gear input shafts; and wherein one of said ratio defining gears is selectively synchronized on one of said first and second input shafts and said ratio defining gear is connected to a ring gear which is in mesh with a plurality of planetary gears having a common carrier and said one of said first and second input shafts in mesh with said planetary gears provides reverse gear when said carrier is grounded and wherein said carrier can be synchronized with one other of said first and second input shafts to provide an additional gear ratio to said ratio defining gear.

* * * * *